(12) United States Patent
Chen et al.

(10) Patent No.: US 10,193,676 B2
(45) Date of Patent: Jan. 29, 2019

(54) PILOT ALLOCATION METHOD FOR MULTI-ANTENNA SYSTEM AND PILOT ALLOCATION APPARATUS

(71) Applicant: Beijing Zhigu Rui Tuo Tech Co., Ltd, Beijing (CN)

(72) Inventors: Zhilin Chen, Beijing (CN); Chenyang Yang, Beijing (CN); Weicai Huang, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 6 days.

(21) Appl. No.: 15/505,573

(22) PCT Filed: Jul. 24, 2015

(86) PCT No.: PCT/CN2015/085039
§ 371 (c)(1),
(2) Date: Feb. 21, 2017

(87) PCT Pub. No.: WO2016/026367
PCT Pub. Date: Feb. 25, 2016

(65) Prior Publication Data
US 2017/0295001 A1    Oct. 12, 2017

(30) Foreign Application Priority Data

Aug. 22, 2014    (CN) .......................... 2014 1 0419932

(51) Int. Cl.
*H04L 5/00*      (2006.01)
*H04L 25/02*     (2006.01)
(52) U.S. Cl.
CPC .......... *H04L 5/0048* (2013.01); *H04L 5/0023* (2013.01); *H04L 5/0037* (2013.01); *H04L 5/0073* (2013.01); *H04L 25/0206* (2013.01)

(58) Field of Classification Search
CPC ..... H04B 7/024; H04B 7/0452; H04L 5/0023; H04L 5/0037; H04L 5/0035;
(Continued)

(56) References Cited

U.S. PATENT DOCUMENTS

| 8,089,916 B2 | 1/2012 | Gulasekaran et al. |
| 8,472,566 B2 | 6/2013 | Ko et al. |

(Continued)

FOREIGN PATENT DOCUMENTS

| CN | 101534285 A | 9/2009 |
| CN | 102007704 A | 4/2011 |

(Continued)

OTHER PUBLICATIONS

International Search Report for PCT Application No. PCT/CN2015/085039, dated Oct. 19, 2015, 3 pages.

(Continued)

*Primary Examiner* — Jung Liu
(74) *Attorney, Agent, or Firm* — Amin, Turocy & Watson, LLP

(57) ABSTRACT

A pilot allocation method for a multi-antenna system and a pilot allocation apparatus are provided. The method comprises: determining the number of pilots to be allocated and the number of training cycles at least according to the number of users in each cell, and determining a pilot allocation scheme of the each cell according to the number of pilots to be allocated and the number of training cycles. The determining a pilot allocation scheme of the each cell can comprise determining pilots allocated for users in the l-th cell used during each training cycle, and during each training cycle, allocating pilots of at least the k-th user of the l-th cell to different users in other cells of the system. By allocating pilots allocated to a desired user to different users during each training cycle, pilot contamination can be ran- (Continued)

S120 — Determine the number of pilots to be allocated and the number of training cycles at least according to the number of users in each cell S140 — Determine a pilot allocation scheme of the each cell according to the number of pilots to be allocated and the number of training cycles domized during several different continuous training cycles, thereby providing a basis for the later accurate channel estimation.

30 Claims, 5 Drawing Sheets

(58) Field of Classification Search
CPC ... H04L 5/0069; H04L 5/0055; H04L 5/0057; H04L 12/2869; H04L 12/5695; H04L 47/00; H04L 47/70; H04L 47/78; H04L 47/821; H04L 47/827; H04W 72/04
See application file for complete search history.

(56) References Cited

U.S. PATENT DOCUMENTS

| | | | |
|---|---|---|---|
| 8,918,065 | B2 | 12/2014 | Ihm et al. |
| 2006/0002452 | A1* | 1/2006 | Laroia ............ H04B 1/7143 375/135 |
| 2010/0029213 | A1* | 2/2010 | Wang ............ H04B 1/71072 455/63.1 |
| 2010/0254300 | A1* | 10/2010 | Gulasekaran ....... H04B 7/155 370/315 |
| 2011/0249597 | A1* | 10/2011 | Papadopoulos ..... H04L 5/0023 370/280 |
| 2012/0113953 | A1* | 5/2012 | Papadopoulos ...... H04B 7/024 370/330 |
| 2012/0184317 | A1 | 7/2012 | Ihm et al. |
| 2013/0156021 | A1* | 6/2013 | Ashikhnnin ..... H04L 25/03343 370/338 |

FOREIGN PATENT DOCUMENTS

| | | |
|---|---|---|
| CN | 103298124 A | 9/2013 |
| CN | 103929382 A | 7/2014 |
| CN | 104158644 A | 11/2014 |

OTHER PUBLICATIONS

Baoguo, et al. "Channel estimation for OFDM transmission in multipath fading channels based on parametric channel modeling" IEEE Transactions on Communications, vol. 49, No. 3, Mar. 2001, 13 pages.

Yin, et al. "A coordinated approach to channel estimation in large-scale multiple-antenna systems," IEEE Journal on Selected Areas in Communications, vol. 31, No. 2, Feb. 2013, 10 pages.

Marzetta, Thomas L. "Noncooperative cellular wireless with unlimited numbers of base station antennas," !IEEE Transactions on Wireless Communications, vol. 9, No. 11, Nov. 2010, 11 pages.

Larsson, et al. "Massive MIMO for next generation wireless systems," IEEE Communications Magazine, Feb. 2014., vol. 52, No. 2, 10 pages.

Jose, et al. "Pilot contamination and precoding in multi-cell TDD systems," IEEE Transactions on Wireless Communications, vol. 10, No. 8, Aug. 2011, 12 pages.

Hoydis, et al., "Massive MIMO in the UL/DL of cellular networks: How many antennas do we need?" IEEE Journal on Selected Areas in Communications, vol. 31, No. 2, Feb. 2013, 12 pages.

Ngo, et al. "EVD-based channel estimation in multicell multiuser MIMO systems with very large antenna arrays," in Proc. IEEE ICASSP, 2012. Retrieved on Feb. 1, 2017. 4 pages.

* cited by examiner

PILOT ALLOCATION METHOD FOR MULTI-ANTENNA SYSTEM AND PILOT ALLOCATION APPARATUS

RELATED APPLICATION

The present application is a U.S. National Stage filing under 35 U.S.C. § 371 of international patent cooperation treaty (PCT) application No. PCT/CN2015/085039, filed Jul. 24, 2015, and entitled "PILOT ALLOCATION METHOD FOR MULTI-ANTENNA SYSTEM AND PILOT ALLOCATION APPARATUS", which claims the benefit of priority to Chinese Patent Application No. 201410419932.X, filed on Aug. 22, 2014, which applications are hereby incorporated into the present application by reference herein in their respective entireties.

TECHNICAL FIELD

The present application relates to the field of multi-antenna system technologies, and in particular, to a pilot allocation method for a multi-antenna system and a pilot allocation apparatus.

BACKGROUND

In recent years, multi-antenna systems have shifted from a theoretical research stage to large-scale applications in modern wireless cellular systems. In today's wireless communication field, whether in the actual system or in the theoretical research, inter-cell interference has become a bottleneck, and the bottleneck seriously limits channel capacity and throughput of communication systems. In order to reduce the inter-cell interference, the current research focus is a Multiple-Input Multiple-Output (MIMO) interference alignment technology, and a coordinated network. It has been proved that the technologies can effectively reduce the inter-cell interference. However, facing the amount of data increasing exponentially, comprising wireless phone businesses, as well as constantly increasing demands on wireless data, the technologies neither can fundamentally advance the system capacity by leaps and bounds, nor can meet users' needs.

Massive MIMO is an emerging technology that equips the base stations (BSs) with a large number of antennas to improve spatial resolution and antenna array gain, it can provide a higher data rate with lower power consumption, to cause spectrum utilization to reach an unprecedented level, and thus becomes a potential candidate technology for the-fifth generation cellular networks.

A main problem for Massive MIMO is the availability of instantaneous Channel State Information (CSI). In such a wireless transmission scheme, the base station side has a huge number of low-power small antennas, the number of the antennas is much greater than the number of single-antenna users scheduled at the same time. Massive MIMO can make a wireless communication system achieve a high throughput, and when the number of the antennas of the base station tends to be infinite, channel capacity should be infinite. However, in a practical application scenario, this does not work. The only limiting factor is Pilot Contamination. In a Time-Division Duplex (TDD) system with ideal channel reciprocity, the CSI can be acquired through uplink pilot-aided training. Due to coherence interval with a limited length, the number of available orthogonal pilot sequences is limited. Therefore, the pilot sequences will be reused among several cells, users in adjacent cells sending the same pilot sequence will result in that a result of the channel estimation may not be of the channel between a desired user and the base station, but the estimation contaminated by training sequences sent by users in other cells. As the number of antennas goes to infinite, the Pilot Contamination becomes the bottleneck of the system performance (downlink transmission performance).

SUMMARY

An example, non-limiting objective of the present application is to provide a pilot allocation scheme for a multi-antenna system.

In a first example aspect of the present application, a pilot allocation method for a multi-antenna system is provided, wherein the system comprises L cells, and each cell comprises a base station having M antennas and K single-antenna users, the method comprising:

determining the number of pilots to be allocated and the number of training cycles at least according to the number of users in each cell; and determining a pilot allocation scheme of the each cell according to the number of pilots to be allocated and the number of training cycles;

the determining a pilot allocation scheme of the each cell comprising:

determining pilots allocated for users in the l-th cell used during each training cycle, and during each training cycle, allocating pilots of at least the k-th user of the l-th cell to different users in other cells of the system;

wherein L, M and K are positive integers, $l=(0, \ldots, L-1)$, and $k=(0, \ldots, K-1)$.

In a second example aspect of the present application, a pilot allocation method for a multi-antenna system is provided, wherein the system comprises L cells, and each cell comprises a base station having M antennas and K single-antenna users, the method comprising:

determining a pilot allocation scheme of at least the j-th cell according to a pilot allocation scheme of the l-th cell in the system; and scheduling uplink training of users in the at least the j-th cell according to the pilot allocation scheme of the at least the j-th cell;

wherein, in the determining a pilot allocation scheme of at least the j-th cell:

during each training cycle, pilots allocated to at least the k-th user in the l-th cell are allocated to different users in the at least the j-th cell; and wherein L, M and K are positive integers, $k=(0, \ldots, K-1)$, $l=(0, \ldots, L-1)$, $j=(0, \ldots, L-1)$, and $j \neq l$.

In a third example aspect of the present application, a pilot allocation apparatus for a multi-antenna system is provided, wherein the system comprises L cells, and each cell comprises a base station having M antennas and K single-antenna users, the apparatus comprising:

a first determination module, configured to determine the number of pilots to be allocated and the number of training cycles at least according to the number of users in each cell; and a second determination module, configured to determine a pilot allocation scheme of the each cell according to the number of pilots to be allocated and the number of training cycles;

wherein the determining a pilot allocation scheme of the each cell comprises:

determining pilots allocated for users in the l-th cell used during each training cycle, and during each training cycle, allocating pilots of at least the k-th user of the l-th cell to different users in other cells of the system;

wherein L, M and K are positive integers, l=(0, . . . , L−1), and k=(0, . . . , K−1).

In a fourth example aspect of the present application, a pilot allocation apparatus for a multi-antenna system is provided, wherein the system comprises L cells, and each cell comprises a base station having M antennas and K single-antenna users, the apparatus comprising:

a third determination module, configured to determine a pilot allocation scheme of at least the j-th cell according to a pilot allocation scheme of the l-th cell in the system; and a scheduling module, configured to schedule uplink training of users in the at least the j-th cell according to the pilot allocation scheme of the at least the j-th cell;

wherein, in the determining a pilot allocation scheme of at least the j-th cell:

during each training cycle, pilots allocated to at least the k-th user in the l-th cell are allocated to different users in the at least the j-th cell; and wherein L, M and K are positive integers, k=(0, . . . , K−1), l=(0, . . . , L−1), j=(0, . . . , L−1), and j≠l.

In a fifth example aspect of the present application, a computer readable storage device is provided, comprising at least one executable instruction, which, in response to execution, causes a system comprising a processor to perform operations, comprising:

determining the number of pilots to be allocated for a multi-antenna system and the number of training cycles at least according to the number of users in each cell; and determining a pilot allocation scheme of the each cell according to the number of pilots to be allocated and the number of training cycles;

the determining a pilot allocation scheme of the each cell comprising:

determining pilots allocated for users in the l-th cell used during each training cycle, and during each training cycle, allocating pilots of at least the k-th user of the l-th cell to different users in other cells of the system;

wherein the system comprises L cells, and each cell comprises a base station with M antennas and K single-antenna users, L, M and K are positive integers, l=(0, . . . , L−1), and k=(0, . . . , K−1).

In a sixth example aspect of the present application, a device for pilot allocation for a multi-antenna system is provided, wherein the system comprises L cells, and each cell comprises a base station with M antennas and K single-antenna users. The device comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

determining the number of pilots to be allocated and the number of training cycles at least according to the number of users in each cell; and determining a pilot allocation scheme of the each cell according to the number of pilots to be allocated and the number of training cycles;

the determining a pilot allocation scheme of the each cell comprising:

determining pilots allocated for users in the l-th cell used during each training cycle, and during each training cycle, allocating pilots of at least the k-th user of the l-th cell to different users in other cells of the system;

wherein L, M and K are positive integers, l=(0, . . . , L−1), and k=(0, . . . , K−1).

In a seventh example aspect of the present application, a computer readable storage device is provided, comprising at least one executable instruction, which, in response to execution, causes a system comprising a processor to perform operations, comprising:

determining a pilot allocation scheme of at least the j-th cell according to the pilot allocation scheme of the l-th cell in a multi-antenna system; and scheduling uplink training of users in the at least the j-th cell according to the pilot allocation scheme of the at least the j-th cell;

wherein, the determining a pilot allocation scheme of at least the j-th cell comprising:

during each training cycle, pilots allocated to at least the k-th user in the l-th cell are allocated to different users in the at least the j-th cell; and wherein the system comprises L cells, and each cell comprises a base station with M antennas and K single-antenna users, L, M and K are positive integers, k=(0, . . . , K−1), l=(0, . . . , L−1), j=(0, . . . , L−1), and j≠l.

In an eighth example aspect of the present application, a device for pilot allocation for a multi-antenna system is provided, wherein the system comprises L cells, and each cell comprises a base station with M antennas and K single-antenna users. The comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

determining a pilot allocation scheme of at least the j-th cell according to the pilot allocation scheme of the l-th cell in the system; and scheduling uplink training of users in the at least the j-th cell according to the pilot allocation scheme of the at least the j-th cell;

wherein, the determining a pilot allocation scheme of at least the j-th cell comprising:

during each training cycle, pilots allocated to at least the k-th user in the l-th cell are allocated to different users in the at least the j-th cell; and wherein L, M and K are positive integers, k=(0, . . . , K−1), l=(0, . . . , L−1), j=(0, . . . , L−1), and j≠l.

The methods and the apparatuses of example embodiments of the present application, by allocating pilots allocated to a desired user to different users in each training cycle, can randomize pilot contamination during several different continuous training cycles, thereby providing a basis for the later accurate channel estimation.

DETAILED DESCRIPTION

Figure 1:
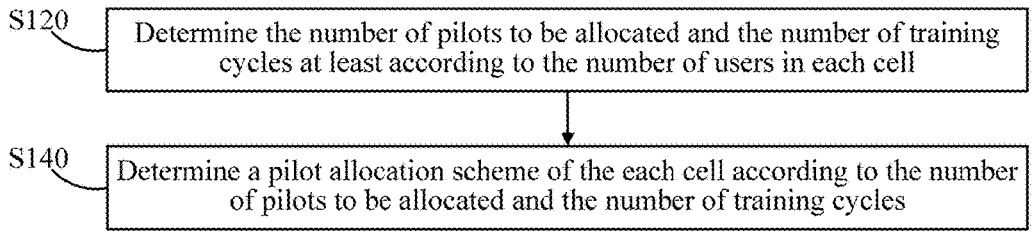
FIG. 1 is an example flowchart of a pilot allocation method for a multi-antenna system according to a first example embodiment of the present application.

Example embodiments of the present application are described in detail hereinafter with reference to the accompanying drawings and embodiments (in which the same elements are denoted by the same reference numerals). The following embodiments are intended to describe the present application, but not to limit the scope of the present application.

It should be understood by those skilled in the art that the terms such as "first" and "second" in the present application are merely intended to distinguish different steps, devices or modules, etc., which neither represent any particular technical meaning nor indicate a necessary logical sequence between them.

The embodiments of the present application provide a new channel estimation scheme for a multi-antenna system, the multi-antenna system refers to an OFDM system with an infinite or large number of antennas, the system has L cells, each cell consists of a base station with M antennas and K (K≤M) single-antenna users, and L, M and K are positive integers. For the base station (BS) of any cell, users within the coverage range of respective BS are called desired users, and a channel between the desired users and the respective BS is called desired channel; users of other cells reusing pilots with the desired users are called interference users, and a channel between the interference users and the respective BS is called interference channel. In such a multi-antenna system, the desired channel and the interference channel are multipath channels with sparsity property. As it is difficult for multipath components of the desired channel and the interference channel to arrive at a receiving side (the BS) on the same time delay through a sparse channel, the multipath components of the desired channel and the multipath components of the interference channel are distinguishable in the time-domain, in addition, due to angular chromatic dispersion of the channels, a signal arrives at the antennas through paths of the channels at different angles, and thus the multipath components of the desired channel and the multipath components of the interference channel are also distinguishable in the angle-domain, and if delay (comprising a time domain delay and an angle domain delay) of each path of the channels is known, a desired multipath component can be extracted from contaminated channel estimation, thereby achieving accurate channel estimation where pilot contamination has been eliminated. However, no matter in what way the delay of each path of the desired channel is acquired and the desired multipath component is extracted, the basis of the extracted multipath component is also contaminated, and thus accuracy of the channel estimation is limited. Therefore, the embodiments of the present application improve the accuracy of the channel estimation by randomizing contamination in several continuous training cycles.

A pilot allocation method for a multi-antenna system according to a first embodiment of the present application is configured to determine a pilot allocation scheme of the whole system. As shown in FIG. 1, the method in this embodiment comprises:

S120. Determine the number of pilots to be allocated and the number of training cycles at least according to the number of users in each cell.

Pilots used in the system are pre-designed, and in the methods of the embodiments of the present application, only how to perform accurate channel estimation to allocate the pilots to be allocated is considered. The "training cycle" refers to a cycle during which a user performs channel training through uplink pilots, that is, the time interval of sending uplink pilot signal. In the methods of the embodiments of the present application, accurate channel estimation can be obtained based on the number of training cycles of pilot signal.

S140. Determine a pilot allocation scheme of the each cell according to the number of pilots to be allocated and the number of training cycles. Specifically, in the determining a pilot allocation scheme of the each cell: pilots allocated to users in the same cell are orthogonal; and users in different cells reuse pilots; and the determining a pilot allocation scheme of the each cell comprising: determining pilots allocated for users in the l-th cell used during each training cycle, and during each training cycle, allocating pilots of at least the k-th user of the l-th cell to different users in other cells of the system;

wherein l=(0, . . . , L−1), and k=(0, . . . , K−1).

In other words, the method of this embodiment, by allocating pilots allocated to a desired user (at least the k-th user in the l-th cell) to different users during each training cycle, can randomize pilot contamination during several different continuous training cycles, thereby providing a basis for the later accurate channel estimation.

In one, a cell having the most users in the multi-antenna system comprises $K_{max}$ users, K' is the number of pilots, B is the number of training cycles, and K' is a prime number not less than $K_{max}$, and B≤$K_{max}$. Preferably, if $K_{max}$ is a prime number, K'=$K_{max}$, and if $K_{max}$ is not a prime number, K' is set as a prime number slightly greater than $K_{max}$.

In order to achieve pilot contamination randomization during different training cycles, in one example embodiment, pilots can be allocated for users in each cell through a circular shift. For example, pilots are allocated for users in the each cell according to the following formula:

$$A_l = \begin{pmatrix} 0 & 1 & 2 & \ldots & K-2 & K-1 \\ l \bmod K & \dfrac{(l+1)}{\bmod K} & \dfrac{(l+2)}{\bmod K} & \ldots & \dfrac{(l-2)}{\bmod K} & \dfrac{(l-1)}{\bmod K} \\ \vdots & \vdots & \vdots & \ldots & \vdots & \vdots \\ \dfrac{[(B-1)l]}{\bmod K} & \dfrac{\left[\dfrac{(B-1)}{l+1}\right]}{\bmod K} & \dfrac{[(B-1)l+2]}{\bmod K} & \ldots & \dfrac{\left[\dfrac{(B-1)}{l-2}\right]}{\bmod K} & \dfrac{[(B-1)l-1]}{\bmod K} \end{pmatrix}$$

wherein $A_l$ is a pilot allocation matrix of the l-th cell, and mod is an operator for calculating a remainder, that is, the remainder of one numerical expression divided by another. The [b,k] element of $A_l$ is an index corresponding to pilots allocated to the k-th user of the l-th cell during the b-th training cycle, and b=(0, . . . , B−1). It can be seen from the above formula that, the r-th row of $A_l$ is rotated elements to the left relative to the (r−1)-th row l. In the matrix, the constants "C" in the dividend (B−1)l+C on the left of "mod" on the final column are symmetrically distributed, and "K" in the matrix is usually set as $K_{max}$. In the embodiments of the present application, the pilots to be allocated are pre-designed, and for ease of description, respective index numbers are set for the pilots to be allocated.

It is noted that, pilot allocation through the circular shift enables interference that all users in all cells suffered during each training cycle to be caused by different users, this is a preferred implementation, it is also feasible to make that the interference some users suffered during each training cycle are caused by different users as needed, and correspondingly, the pilot allocation manner may be any appropriate manner other than the circular shift.

In addition, the method of the embodiment of the present application may further comprise:

S160. Send the determined pilot allocation scheme. The apparatus performing the method of this embodiment should, after determining the pilot allocation scheme, send the pilot allocation scheme to the base station of each cell, for the base station to schedule respective unlink training.

Figure 2:
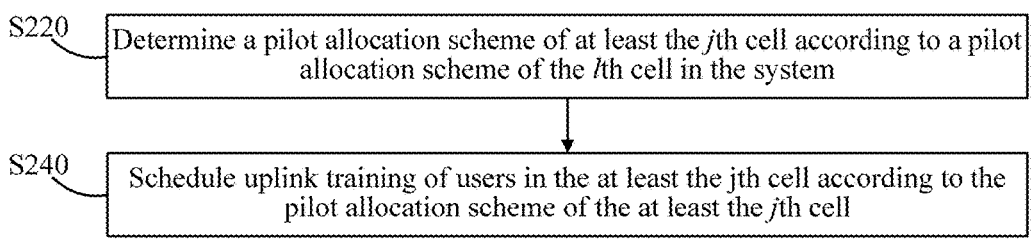
FIG. 2 is an example flowchart of a pilot allocation method for a multi-antenna system according to a second example embodiment of the present application.

A pilot allocation scheme determined by a pilot allocation method for a multi-antenna system according to a second embodiment of the present application is configured to coordinate other cells in the system for channel estimation. As shown in FIG. 2, the method of this embodiment comprises:

S220. Determine a pilot allocation scheme of at least the j-th cell according to a pilot allocation scheme of the l-th cell in the system.

In the method of this embodiment, the l-th cell is a cell which may need channel estimation. The at least the j-th cell is any cell different from the l-th cell, and pilot allocation of the at least the j-th cell is performed according to the method of this embodiment so as to coordinate channel estimation of the l-th cell.

S240. Schedule uplink training of users in the at least the j-th cell according to the pilot allocation scheme of the at least the j-th cell.

In the system, pilots allocated to users in the same cell are orthogonal; and users in different cells reuse pilots. In the determining a pilot allocation scheme of at least the j-th cell:

during each training cycle, pilots allocated to at least the k-th user in the l-th cell are allocated to different users in the at least the j-th cell; and wherein k=(0, . . . , K−1), l=(0, . . . , L−1), j=(0, . . . , L−1), and j≠l.

In other words, the method of this embodiment, by allocating pilots allocated to a desired user (at least the k-th user in the l-th cell) to different users during each training cycle, can randomize pilot contamination during several different continuous training cycles, thereby providing a basis for the later accurate channel estimation.

In order to determine the pilot allocation scheme, in one example embodiment, the method of this embodiment further comprises:

S210. Determine the number of pilots to be allocated and the number of training cycles. Preferably, the number of pilots to be allocated and the number of training cycles are determined at least according to the number of users in each cell. For example, the number of pilots to be allocated K' is a prime number not less than $K_{max}$, and $K_{max}$ is the maximum number of users in each cell; and the number of training cycles is B≤$K_{max}$. Preferably, if K max is a prime number, K'=$K_{max}$, and if $K_{max}$ is not a prime number, K' is set as a prime number slightly greater than $K_{max}$.

In order to achieve pilot contamination randomization during different training cycles, in one example embodiment, pilots can be allocated for users in each cell through a circular shift. For example, pilots are allocated for users in the at least the j-th cell according to the following formula:

$$A_j = \begin{pmatrix} 0 & 1 & 2 & \ldots & K-2 & K-1 \\ j \bmod K & \dfrac{(j+1)}{\bmod K} & \dfrac{(j+2)}{\bmod K} & \ldots & \dfrac{(j-2)}{\bmod K} & \dfrac{(j-1)}{\bmod K} \\ \vdots & \vdots & \vdots & \ldots & \vdots & \vdots \\ \dfrac{[(B-1)j]}{\bmod K} & \dfrac{\left[\dfrac{(B-1)}{j+1}\right]}{\bmod K} & \dfrac{[(B-1)j+2]}{\bmod K} & \ldots & \dfrac{\left[\dfrac{(B-1)}{j-2}\right]}{\bmod K} & \dfrac{[(B-1)j-1]}{\bmod K} \end{pmatrix}$$

wherein $A_j$ is a pilot allocation matrix of the j-th cell, the [b,k] element of $A_j$ is indexes corresponding to pilots allocated to the k-th user of the j-th cell during the b-th training cycle, and b=(0, . . . , B−1). It can be seen from the above formula that, the r-th row of $A_j$ is rotated elements to the left relative to the (r−1)-th row l. In the matrix, the constants "C" in the dividend (B−1)l+C on the left of "mod" on the final column are symmetrically distributed, and "K" in the matrix is usually set as $K_{max}$. In the embodiments of the present application, the pilots to be allocated are pre-designed, and for ease of description, respective index numbers are set for the pilots to be allocated.

In addition, the method of this embodiment further comprises:

S260. Send the determined pilot allocation scheme of the at least the j-th cell. According to the role of the apparatus performing the method of this embodiment, the pilot allocation scheme should be sent to the base station of the at least the j-th cell after the pilot allocation scheme is determined, for the base station to schedule respective uplink training.

It should be understood by those skilled in the art that, in any one of the foregoing methods of the specific implementations of the present application, the value of the serial number of each step described above does not mean an execution sequence, and the execution sequence of each step should be determined according to the function and internal logic thereof, and should not be any limitation to the implementation procedure of the specific implementations of the present application.

In addition, the embodiment of the present application further provides one computer readable medium, comprising a computer readable instruction performing the following operation when being executed: performing the operations of the steps of the method in the implementation shown in FIG. 1.

The embodiment of the present application further provides another computer readable medium, comprising a computer readable instruction performing the following operation when being executed: performing the operations of the steps of the method in the implementation shown in FIG. 2.

Figure 3:
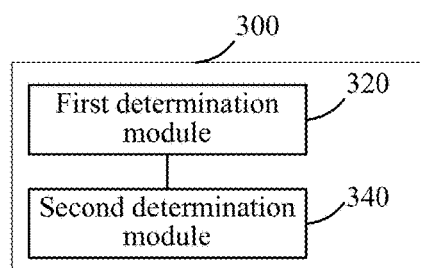
FIG. 3 is an example block diagram of a first implementation of a pilot allocation apparatus for a multi-antenna system according to the first example embodiment of the present application.

The present application further provides a pilot allocation apparatus for a multi-antenna system. The apparatus may belong to or be independent of any base station in the multi-antenna system. In the various embodiments of the present application, the base station refers to a random node of a network end communicating with a terminal in a broad sense, such as a Node B, an eNode B, a base station or an access point (AP). The pilot allocation apparatus for a multi-antenna system according to the first embodiment of the present application is configured to determine a pilot allocation scheme of the whole system. As shown in FIG. 3, the apparatus 300 in this embodiment comprises:

A first determination module 320, configured to determine the number of pilots to be allocated and the number of training cycles at least according to the number of users in each cell.

In the apparatus of the embodiments of the present application, the "training cycle" refers to a cycle during which a user performs channel training through uplink pilots, that is, the time interval of sending uplink pilot signal. In the apparatus of the embodiments of the present application, accurate channel estimation can be obtained based on the number of training cycles of pilot signal.

A second determination module 340, configured to determine a pilot allocation scheme of the each cell according to the number of pilots to be allocated and the number of training cycles. Specifically, in the determining a pilot allocation scheme of the each cell: pilots allocated to users in the same cell are orthogonal; and users in different cells reuse pilots; and determining pilots allocated for users in the l-th cell used during each training cycle, and during each training cycle, allocating pilots of at least the k-th user of the l-th cell to different users in other cells of the system;

wherein l=(0, . . . , L−1), and k=(0, . . . , K−1).

In other words, the apparatus of this embodiment, by allocating pilots allocated to a desired user (at least the k-th user in the l-th cell) to different users during each training cycle, can randomize pilot contamination during several different continuous training cycles, thereby providing a basis for the later accurate channel estimation.

In one example embodiment, a cell having the most users in cells of the multi-antenna system comprises $K_{max}$ users, K' is the number of pilots, B is the number of training cycles, and K' is a prime number not less than $K_{max}$, and B≤$K_{max}$. Preferably, if $K_{max}$ is a prime number, K'=$K_{max}$, and if $K_{max}$ is not a prime number, K' is set as a prime number slightly greater than $K_{max}$.

In order to achieve pilot contamination randomization during different training cycles, in one example embodiment, the second determination module 340 can allocate pilots for users in each cell through a circular shift. For example, pilots are allocated for users in the each cell according to the following formula:

$$A_l = \begin{pmatrix} 0 & 1 & 2 & \ldots & K-2 & K-1 \\ l \bmod K & (l+1) \bmod K & (l+2) \bmod K & \ldots & (l-2) \bmod K & (l-1) \bmod K \\ \vdots & \vdots & \vdots & \ldots & \vdots & \vdots \\ [(B-1)l] \bmod K & \begin{bmatrix}(B-1)\\l+1\end{bmatrix} \bmod K & [(B-1)l+2] \bmod K & \ldots & \begin{bmatrix}(B-1)\\l-2\end{bmatrix} \bmod K & [(B-1)l-1] \bmod K \end{pmatrix}$$

wherein $A_l$ is a pilot allocation matrix of the l-th cell, and mod is a n operator for calculating a remainder, that is, the remainder of one numerical expression divided by another. The [b,k] element of $A_l$ is an index corresponding to pilots allocated to the k-th user of the l-th cell during the b-th training cycle, and b=(0, . . . , B−1). It can be seen from the above formula that, the r-th row of $A_l$ is rotated elements to the left relative to the (r−1)-th row l. In the matrix, the constants "C" in the dividend (B−1)l+C on the left of "mod" on the final column are symmetrically distributed, and "K" in the matrix is usually set as $K_{max}$. In the embodiments of the present application, the pilots to be allocated are pre-designed, and for ease of description, respective index numbers are set for the pilots to be allocated.

It is noted that, pilot allocation through the circular shift enables interference that all users in all cells suffered during each training cycle to be caused by different users, this is a preferred implementation, it is also feasible to make that the interference some users suffered during each training cycle are caused by different users as needed, and correspondingly, the manner in which the second determination module 340 allocates pilots may be any appropriate manner other than the circular shift.

Figure 4:
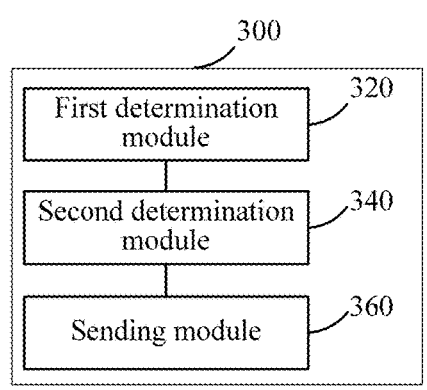
FIG. 4 is an example block diagram of a second implementation of the pilot allocation apparatus for a multi-antenna system according to the first embodiment of the present application.

In addition, as shown in FIG. 4, the apparatus 300 of the embodiment of the present application may further comprise:

A sending module 360, configured to send the determined pilot allocation scheme. The apparatus of this embodiment should send the pilot allocation scheme to the base station of each cell after the pilot allocation scheme is determined, for the base station to schedule respective unlink training.

Figure 5:
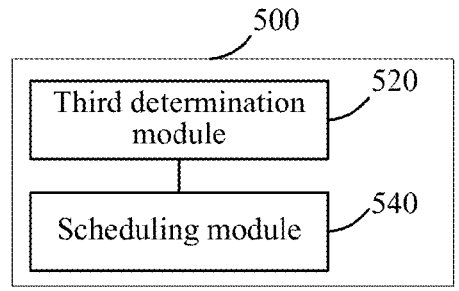
FIG. 5 is an example block diagram of a first implementation of a pilot allocation apparatus for a multi-antenna system according to the second example embodiment of the present application.

A pilot allocation apparatus for a multi-antenna system according to the second embodiment of the present application is configured to coordinate other cells in the system for channel estimation so as to determine pilot allocation. As shown in FIG. 5, the apparatus 500 of this embodiment comprises:

A third determination module 520, configured to determine a pilot allocation scheme of at least the j-th cell according to a pilot allocation scheme of the l-th cell in the system.

In the apparatus of this embodiment, the l-th cell is a cell which may need channel estimation. The at least the j-th cell is any cell different from the l-th cell, and the third determination module 520 determines pilot allocation of the at least the j-th cell so as to coordinate channel estimation of the l-th cell.

A scheduling module 540, configured to schedule uplink training of users in the at least the j-th cell according to the pilot allocation scheme of the at least the j-th cell determined by the third determination module 520.

In the system, pilots allocated to users in the same cell are orthogonal; and users in different cells reuse pilots. In the determining a pilot allocation scheme of at least the j-th cell:

during each training cycle, pilots allocated to at least the k-th user in the l-th cell are allocated to different users in the at least the j-th cell; and wherein k=(0, . . . , K−1), l=(0, . . . , L−1), j=(0, . . . , L−1), and j≠l.

In other words, the apparatus of this embodiment, by allocating pilots allocated to a desired user (at least the k-th user in the l-th cell) to different users during each training cycle, can randomize pilot contamination during several different continuous training cycles, thereby providing a basis for the later accurate channel estimation.

Figure 6:
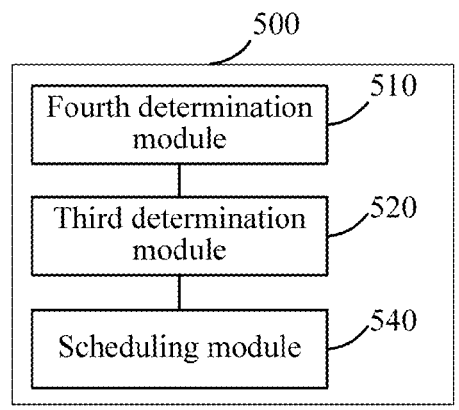
FIG. 6 is an example block diagram of a second implementation of the pilot allocation apparatus for a multi-antenna system according to the second example embodiment of the present application.

In order to determine the pilot allocation scheme, as shown in FIG. 6, in one example embodiment, the apparatus 500 of this embodiment further comprises:

A fourth determination module 510, configured to determine the number of pilots to be allocated and the number of training cycles. Preferably, the fourth determination module 510 may determine the number of pilots to be allocated and the number of training cycles at least according to the number of users in each cell. For example, the number of pilots to be allocated K' is a prime number not less than $K_{max}$, and $K_{max}$ is the maximum number of users in each cell; and the number of training cycles is B≤$K_{max}$. Preferably, if $K_{max}$ is a prime number, K'=$K_{max}$, and if $K_{max}$ is not a prime number, K' is set as a prime number slightly greater than $K_{max}$.

In addition, in order to achieve pilot contamination randomization during different training cycles, in one example embodiment, the third determination module 520 may allocate pilots for users in each cell through a circular shift. For example, pilots are allocated for users in the at least the j-th cell according to the following formula:

$$A_j = \begin{pmatrix} 0 & 1 & 2 & \ldots & K-2 & K-1 \\ j \bmod K & (j+1) \bmod K & (j+2) \bmod K & \ldots & (j-2) \bmod K & (j-1) \bmod K \\ \vdots & \vdots & \vdots & \ldots & \vdots & \vdots \\ [(B-1)j] \bmod K & \begin{bmatrix} (B-1) \\ j+1 \end{bmatrix} \bmod K & [(B-1)j+2] \bmod K & \ldots & \begin{bmatrix} (B-1) \\ j-2 \end{bmatrix} \bmod K & [(B-1)j-1] \bmod K \end{pmatrix}$$

wherein $A_j$ is a pilot allocation matrix of the j-th cell, the [b,k] element of $A_j$ is indexes corresponding to pilots allocated to the k-th user of the j-th cell during the b-th training cycle, and b=(0, . . . , B−1). It can be seen from the above formula that, the r-th row of $A_j$ is rotated elements to the left relative to the (r−1)-th row l. In the matrix, the constants "C" in the dividend (B−1)l+C on the left of "mod" on the final column are symmetrically distributed, and "K" in the matrix is usually set as $K_{max}$. In the embodiments of the present application, the pilots to be allocated are pre-designed, and for ease of description, respective index numbers are set for the pilots to be allocated.

Figure 7:
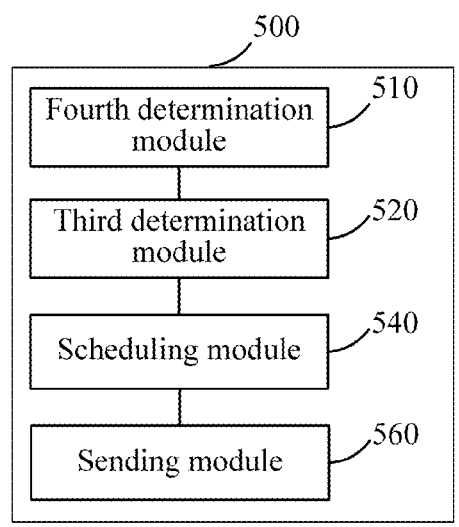
FIG. 7 is an example block diagram of a third implementation of the pilot allocation apparatus for a multi-antenna system according to the second example embodiment of the present application.

In addition, as shown in FIG. 7, the apparatus 500 of the embodiment of the present application may further comprise:

A sending module 560, configured to send the determined pilot allocation scheme of the at least the j-th cell. The apparatus of this embodiment should send the pilot allocation scheme to the base station of the at least the j-th cell after the pilot allocation scheme is determined, for the base station to schedule respective uplink training.

Figure 8:
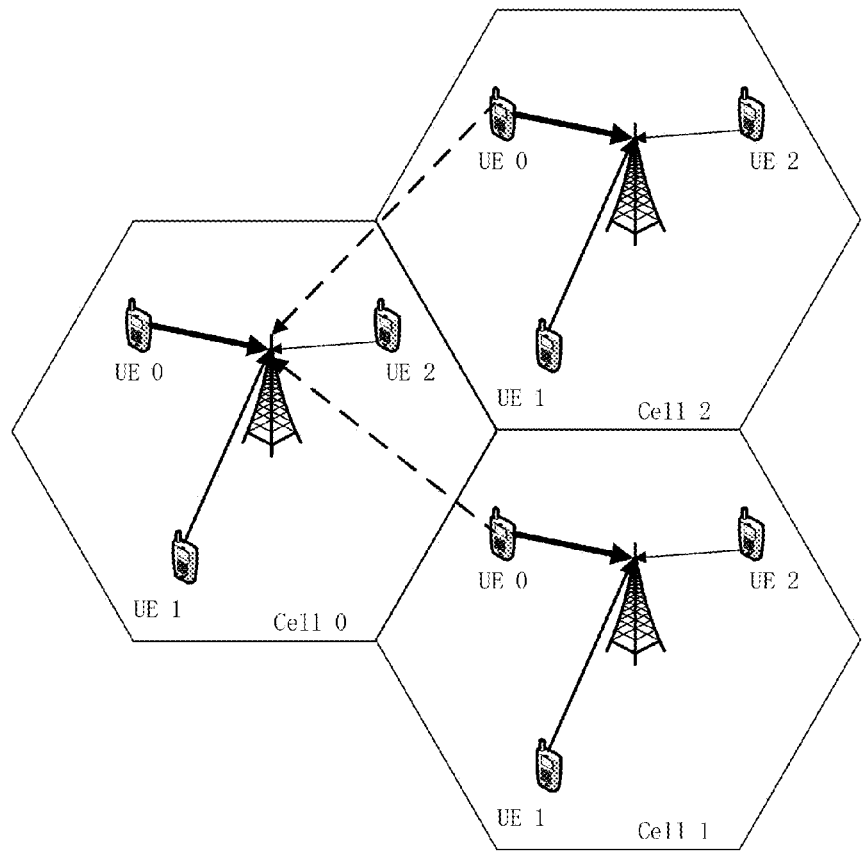
FIG. 8 is an example schematic diagram of one application scenario of the example embodiments of the present application.

By taking an OFDM system with N subcarriers shown in FIG. 8 as an example, the system comprises three cells, Cell 0, Cell 1 and Cell 2, that is, l∈{0,1,2}, and each cell comprises a base station with M antennas and three single-antenna users UE 0, UE 1 and UE 2, that is, $K_{max}$×3, and k∈{0,1,2}. In uplink training phase, pilots are inserted to Np subcarriers out of N subcarriers, to probe CSI for each user. For simplification, assume that Np=N, that is, all subcarriers are utilized for channel probing. In order to eliminate intra-cell multiuser interference, the pilots of users in the same cell should be orthogonal. A time-division scheme is adopted to fulfill the orthogonality: each user monopolizes one OFDM symbol for training, and totally K'=$K_{max}$=3 OFDM symbols are required during each training cycle for training for each cell. Assume that full time-division multiplexing is adopted between cells, the 3 OFDM symbols are shared by all the cells, thereby causing serious pilot contamination. By taking the cell Cell 0 as an example, in the uplink training phase, a pilot signal (the thickest solid line) of a desired user UE 0 in the cell Cell 0 is interfered (the dotted line) by interference users UE 0 in Cell 1 and Cell 2, resulting in that channel estimation of the base station of Cell 0 for the desired user UE 0 inaccurate, that is, pilot contamination exists. In order to obtain accurate CSI, the base station of Cell 0 or the apparatus independent of the base station first determines a pilot allocation scheme for each cell according to the method of the embodiment of the present application:

The number of pilots K determined according to the number of users is 3, and there are totally B=$K_{max}$=3 training cycles. 3 pilots respectively occupy the first 3 OFDM symbols during each training cycle. Pilot allocation schemes of 3 users of 3 cells during 3 training cycles are generated through a circular shift, to make pilot contamination that all the users suffered during each training to be caused by different users. The [b,k]th element of a 3×3 allocation matrix $A_l$ is used to indicate indexes of OFDM symbols occupied by the k-th user of the l-th cell during the b-th training cycle. The element on the first line of $A_l$ is [0 1 2], and the element on the r-th row of $A_l$ is rotated elements to the left relative to the (r−1)-th row l. The obtained allocation matrices $A_0$, $A_1$ and $A_2$ are respectively:

$$\begin{pmatrix} 0 & 1 & 2 \\ 0 & 1 & 2 \\ 0 & 1 & 2 \end{pmatrix},$$

$$\begin{pmatrix} 0 & 1 & 2 \\ 1 & 2 & 0 \\ 2 & 0 & 1 \end{pmatrix},$$

$$\begin{pmatrix} 0 & 1 & 2 \\ 2 & 0 & 1 \\ 1 & 2 & 0 \end{pmatrix},$$

Figure 9:
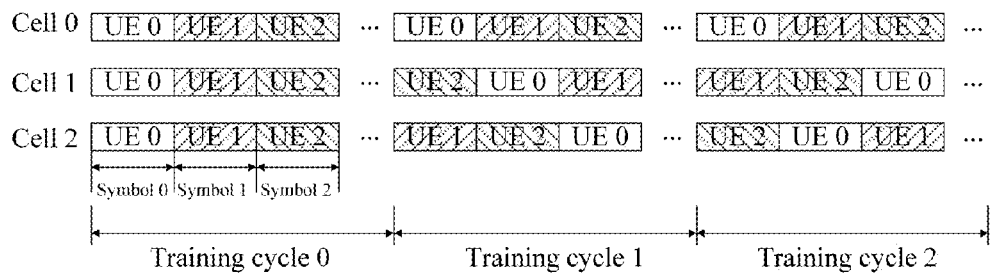
FIG. 9 is an example schematic diagram of pilot allocation in an example shown in FIG. 8.

Element values in the matrices are symbol indexes occupied by pilots of the users, and pilot allocation results corresponding thereto are as shown in FIG. 9.

Figure 10:
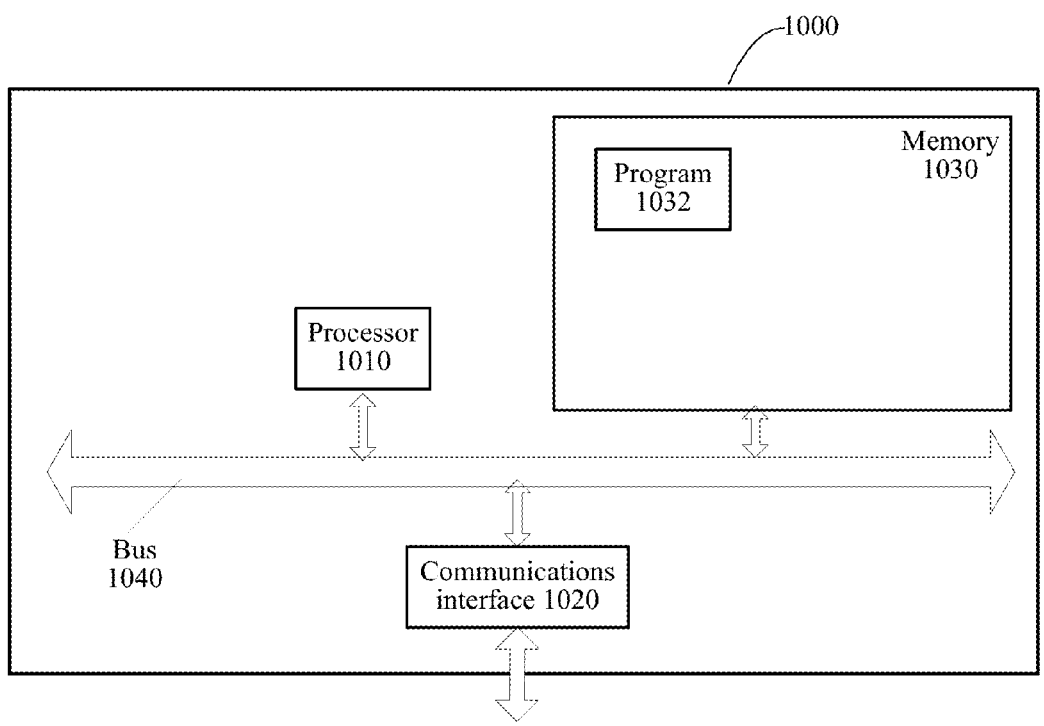
FIG. 10 is an example block diagram of a third implementation of the pilot allocation apparatus for a multi-antenna system according to the first example embodiment of the present application.

FIG. 10 is a schematic structural diagram of a pilot allocation apparatus for a multi-antenna system 1000 according to the first embodiment of the present application; the specific embodiment of the present application does not limit specific implementation of the pilot allocation apparatus for a multi-antenna system 1000. As shown in FIG. 10, the pilot allocation apparatus for a multi-antenna system 1000 may comprise:

a processor 1010, a communications interface 1020, a memory 1030, and a communications bus 1040.

The processor 1010, the communications interface 1020, and the memory 1030 accomplish mutual communications via the communications bus 1040.

The communications interface 1020 is configured to communicate with a network element such as a client.

The processor 1010 is configured to execute a program 1032, and specifically, can implement relevant functions of the pilot allocation apparatus for a multi-antenna system in the apparatus embodiment of FIG. 3.

Specifically, the program 1032 may comprise a program code, the program code comprising a computer operation instruction.

The processor 1010 may be a central processing unit (CPU), or an application specific integrated circuit (ASIC), or be configured to be one or more integrated circuits which implement the embodiments of the present application. The program 1032 may be specifically configured to cause the pilot allocation apparatus for a multi-antenna system 1000 to perform the following steps:

determining the number of pilots to be allocated and the number of training cycles at least according to the number of users in each cell; and determining a pilot allocation scheme of the each cell according to the number of pilots to be allocated and the number of training cycles;

the determining a pilot allocation scheme of the each cell comprising:

determining pilots allocated for users in the l-th cell used during each training cycle, and during each training cycle, allocating pilots of at least the k-th user of the l-th cell to different users in other cells of the system;

wherein L, M and K are positive integers, $l=(0, \ldots, L-1)$, and $k=(0, \ldots, K-1)$.

Reference can be made to corresponding description in the corresponding steps and units in the embodiments for specific implementation of the steps in the program 1032, which is not repeated herein. Those skilled in the art can clearly understand that, reference can be made to the corresponding process description in the method embodiments for the devices described above and the specific working procedures of the modules, and will not be repeated herein in order to make the description convenient and concise.

Figure 11:
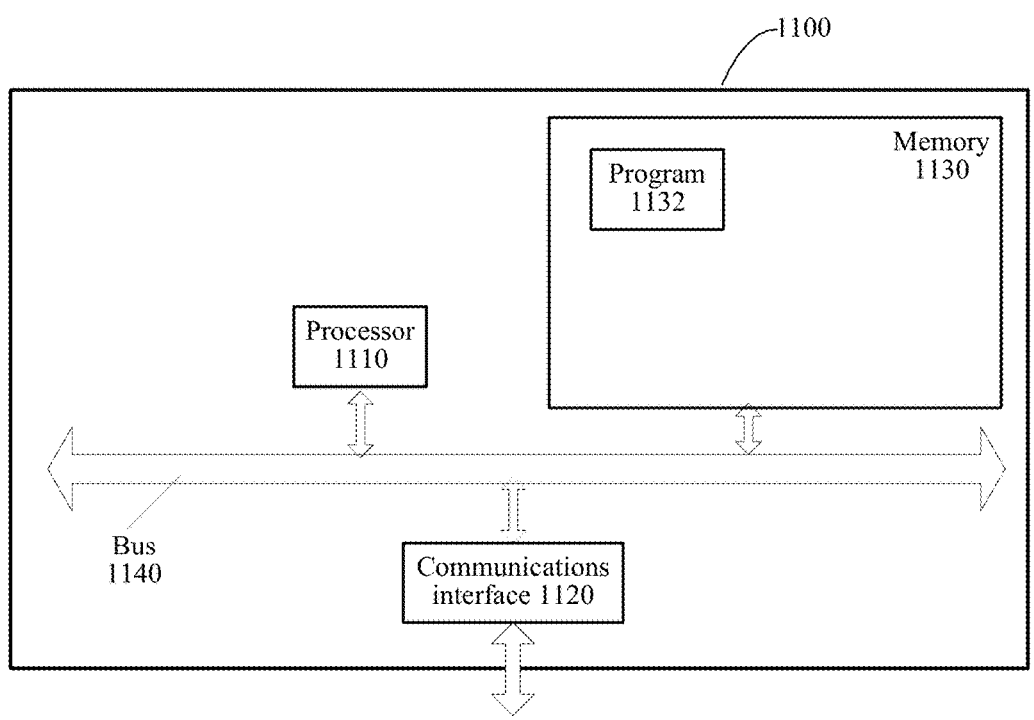
FIG. 11 is an example block diagram of a fourth implementation of the pilot allocation apparatus for a multi-antenna system according to the second example embodiment of the present application.

FIG. 11 is a schematic structural diagram of a pilot allocation apparatus for a multi-antenna system 1100 according to the second embodiment of the present application; the specific embodiment of the present application does not limit specific implementation of the pilot allocation apparatus for a multi-antenna system 1100. As shown in FIG. 11, the pilot allocation apparatus for a multi-antenna system 1100 may comprise:

a processor 1110, a communications interface 1120, a memory 1130, and a communications bus 1140.

The processor 1110, the communications interface 1120, and the memory 1130 accomplish mutual communications via the communications bus 1140.

The communications interface 1120 is configured to communicate with a network element such as a client.

The processor 1110 is configured to execute a program 1132, and specifically, can implement relevant functions of the pilot allocation apparatus for a multi-antenna system in the apparatus embodiment of FIG. 5.

Specifically, the program 1132 may comprise a program code, the program code comprising a computer operation instruction.

The processor 1110 may be a central processing unit (CPU), or an application specific integrated circuit (ASIC), or be configured to be one or more integrated circuits which implement the embodiments of the present application. The program 1132 may be specifically configured to cause the pilot allocation apparatus for a multi-antenna system 1100 to perform the following steps:

determining a pilot allocation scheme of at least the j-th cell according to a pilot allocation scheme of the l-th cell in the system; and scheduling uplink training of users in the at least the j-th cell according to the pilot allocation scheme of the at least the j-th cell;

wherein, in the determining a pilot allocation scheme of at least the j-th cell:

during each training cycle, pilots allocated to at least the k-th user in the l-th cell are allocated to different users in the at least the j-th cell; and wherein L, M and K are positive integers, $k=(0, \ldots, K-1)$, $l=(0, \ldots, L-1)$, $j=(0, \ldots, L-1)$, and $j \neq l$.

Reference can be made to corresponding description in the corresponding steps and units in the embodiments for specific implementation of the steps in the program 1132, which is not repeated herein. Those skilled in the art can clearly understand that, reference can be made to the corresponding process description in the method embodiments for the devices described above and the specific working procedures of the modules, and will not be repeated herein in order to make the description convenient and concise.

Those skilled in the art can clearly understand that, reference can be made to the corresponding process description in the apparatus embodiments for the devices described above and the specific working procedures of the modules, and will not be repeated herein in order to make the description convenient and concise.

Although the various embodiments are described herein in the general context of program modules that execute in conjunction with an application program that runs on an operating system on a computer system, those skilled in the art will recognize that the invention may also be implemented in combination with other types of program modules. Generally, program modules comprise routines, programs, components, data structures and other types of structures that perform particular tasks or implement particular abstract data types. It can be understood by those skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-Ray disc or other optical storage devices, a magnetic tape, magnetic disk storage or other magnetic storage devices, or any other medium that can be used for storing required information and can be accessed by a computer.

The above example embodiments are only intended to describe the present application rather than to limit the present application; various changes and variations can be made by those of ordinary skill in the art without departing from the spirit and scope of the present application, so all equivalent technical solutions also belong to the category of the present application, and the scope of patent protection of the present application should be defined by the claims.

What is claimed is:

1. A method for a multi-antenna system, wherein the multi-antenna system comprises L cells, and each cell comprises a base station with M antennas and K single-antenna users, the method comprising:
   determining, by a system comprising a processor, a first number of pilots to be allocated and a second number of training cycles at least according to a third number of users in each cell; and
   determining a pilot allocation scheme of the each cell according to the first number of pilots to be allocated and the second number of training cycles;
   the determining the pilot allocation scheme of the each cell comprising:
   determining first pilots allocated for users in the l-th cell used during each training cycle of the training cycles, and during each training cycle, allocating second pilots of at least the k-th user of the l-th cell to different users in other cells of the multi-antenna system,
   wherein L, M and K are positive integers, l=(0, ..., L−1), and k=(0, ..., K−1),
   wherein the first number of pilots to be allocated K' is a prime number not less than $K_{max}$, and $K_{max}$ indicates the third number of users in a cell with most users in the multi-antenna system,
   wherein the second number of training cycles B≤$K_{max}$,
   wherein the determining the pilot allocation scheme of the each cell comprises allocating pilots for users in the each cell according to the following:

$$A_l = \begin{bmatrix} 0 & 1 & 2 & L & K-2 & K-1 \\ l \bmod K & (l+1) \bmod K & (l+2) \bmod K & L & (l-2) \bmod K & (l-1) \bmod K \\ M & M & M & L & M & M \\ [(B-1)l] \bmod K & [(B-1)l+1] \bmod K & [(B-1)l+2] \bmod K & L & [(B-1)l-2] \bmod K & [(B-1)l-1] \bmod K \end{bmatrix},$$

and
   wherein $A_l$ is a pilot allocation matrix of the l-th cell, the [b,k] element of $A_l$ is an index corresponding to pilots allocated to the k-th user of the l-th cell during the b-th training cycle, and b=(0, ..., B−1).

2. The method of claim 1, wherein the pilots of the first number of pilots to be allocated are pre-determined pilots.

3. The method of claim 1, wherein the training cycles of the second number of training cycles are continuous training cycles.

4. The method of claim 1, wherein the pilot allocation of the j-th cell further comprises coordinating channel estimation of the l-th cell.

5. The method of claim 1, wherein the determining the pilot allocation scheme of the each cell comprises:
   allocating orthogonal pilots to users in a same cell, and wherein users in different cells reuse pilots.

6. The method of claim 1, further comprising:
   sending the pilot allocation scheme.

7. The method of claim 6, wherein the sending of the pilot allocation scheme comprises:
   sending the pilot allocation scheme to the base station of each cell after the pilot allocation scheme is determined.

8. A method for a multi-antenna system, wherein the multi-antenna system comprises L cells, and each cell comprises a base station device with M antennas and K single-antenna users, the method comprising:
   determining, by a system comprising a processor, a pilot allocation scheme of at least a j-th cell according to another pilot allocation scheme of an l-th cell in the multi-antenna system; and
   scheduling uplink training of users in at least the j-th cell according to the pilot allocation scheme of at least the j-th cell,
   wherein the determining the pilot allocation scheme of at least the j-th cell comprises:
   during each training cycle, pilots allocated to at least a k-th user in the l-th cell are allocated to different users in at least the j-th cell,
   wherein L, M and K are positive integers, k=(0, ..., K−1), j=(0, ..., L−1), and j≠l,
   wherein a first number of pilots to be allocated K' is a prime number not less than $K_{max}$, and $K_{max}$ indicates a maximum number of users in each cell,
   wherein a second number of training cycles B≤$K_{max}$,
   wherein the determining the pilot allocation scheme of at least the j-th cell comprises allocating pilots for users in at least the j-th cell according to an equation, as follows:

$$A_j = \begin{bmatrix} 0 & 1 & 2 & L & K-2 & K-1 \\ j \bmod K & (j+1) \bmod K & (j+2) \bmod K & L & (j-2) \bmod K & (j-1) \bmod K \\ M & M & M & L & M & M \\ [(B-1)j] \bmod K & [(B-1)j+1] \bmod K & [(B-1)j+2] \bmod K & L & [(B-1)j-2] \bmod K & [(B-1)j-1] \bmod K \end{bmatrix},$$

and wherein $A_j$ is a pilot allocation matrix of the j-th cell, the [b,k] element of $A_j$ is an index corresponding to pilots allocated to the k-th user of the j-th cell during the b-th training cycle, and b=(0, ..., B−1).

9. The method of claim 8, further comprising:
determining the first number of pilots to be allocated and the second number of training cycles.

10. The method of claim 9, wherein the first number of pilots to be allocated and the second number of training cycles are determined at least according to a third number of users in each cell.

11. The method of claim 8, wherein the scheduling of the uplink training of the users is respectively performed by the base station of each cell.

12. The method of claim 8, wherein the pilot allocation scheme comprises performing pilot allocation for each user using a circular shifting of pilots.

13. The method of claim 8, further comprising:
sending the pilot allocation scheme of the at least the j-th cell.

14. An apparatus for a multi-antenna system, wherein the multi-antenna system comprises L cells, and each cell comprises a base station with M antennas and K single-antenna users, the apparatus comprising:
a memory that stores executable modules; and
a processor, couple to the memory, that executes or facilitates execution of the executable modules, the executable modules comprising:
a first determination module configured to determine a first number of pilots to be allocated and a second number of training cycles at least according to a third number of users in each cell; and
a second determination module configured to determine a pilot allocation scheme of the each cell according to the first number of pilots to be allocated and the second number of training cycles;
wherein determination of the pilot allocation scheme of the each cell comprises:
a determination of first pilots allocated for users in the l-th cell used during each training cycle of the training cycles, and
during each training cycle, an allocation of second pilots of at least the k-th user of the l-th cell to different users in other cells of the multi-antenna system,
wherein L, M and K are positive integers, l=(0, ..., L−1), and k=(0, ..., K−1),
wherein the first number of the pilots K' determined by the first determination module is a prime number not less than $K_{max}$, and $K_{max}$ indicates the third number of users in a cell with most users in the multi-antenna system,
wherein the second number of training cycles B≤$K_{max}$,
wherein the second determination module allocates pilots for users in the each cell according to an equation:

$$A_l = \begin{bmatrix} 0 & 1 & 2 & L & K-2 & K-1 \\ l \bmod K & (l+1) \bmod K & (l+2) \bmod K & L & (l-2) \bmod K & (l-1) \bmod K \\ M & M & M & L & M & M \\ [(B-1)l] \bmod K & [(B-1)l+1] \bmod K & [(B-1)l+2] \bmod K & L & [(B-1)l-2] \bmod K & [(B-1)l-1] \bmod K \end{bmatrix},$$

and wherein $A_l$ is a pilot allocation matrix of the l-th cell, the [b,k] element of $A_l$ is an index corresponding to pilots allocated to the k-th user of the l-th cell during the b-th training cycle, and b=(0, ..., B−1).

15. The apparatus of claim 14, wherein the pilot allocation scheme comprises a circular shifting of respective pilot allocations for each user.

16. The apparatus of claim 14, wherein the training cycles of the second number of training cycles are continuous training cycles.

17. The apparatus of claim 14, wherein pilots allocated by the second determination module to users in a same cell are orthogonal; and users in different cells reuse pilots.

18. The apparatus of claim 14, wherein the executable modules further comprise:
a sending module configured to send the pilot allocation scheme.

19. The apparatus of claim 18, wherein the sending module is further configured to send the pilot allocation scheme to the base station of each cell in response to the pilot allocation scheme being determined.

20. An apparatus for a multi-antenna system, wherein the multi-antenna system comprises L cells, and each cell comprises a base station with M antennas and K single-antenna users, the apparatus comprising:
a memory that stores executable modules; and
a processor, couple to the memory, that executes or facilitates execution of the executable modules, the executable modules comprising:
a first determination module configured to determine a pilot allocation scheme of at least a j-th cell according to another pilot allocation scheme of an l-th cell in the multi-antenna system; and
a scheduling module configured to schedule uplink training of users in at least the j-th cell according to the pilot allocation scheme of the at least the j-th cell,
wherein, in the pilot allocation scheme of at least the j-th cell being determined comprises:
during each training cycle, pilots allocated to at least the k-th user in the l-th cell are allocated to different users in at least the j-th cell, wherein L, M and K are positive integers, k=(0, ..., K−1), j=(0, ..., L−1), and j≠l, wherein a first number of pilots to be allocated K' determined by a second determination module is a prime number not less than $K_{max}$, and $K_{max}$ indicates a maximum number of users in each cell, wherein a second number of training cycles B≤$K_{max}$, wherein the first determination module allocates pilots for users in the each cell of at least the j-th cell according to a formula, as follows:

$$A_j = \begin{bmatrix} 0 & 1 & 2 & L & K-2 & K-1 \\ j \bmod K & (j+1) \bmod K & (j+2) \bmod K & L & (j-2) \bmod K & (j-1) \bmod K \\ M & M & M & L & M & M \\ [(B-1)j] \bmod K & [(B-1)j+1] \bmod K & [(B-1)j+2] \bmod K & L & [(B-1)j-2] \bmod K & [(B-1)j-1] \bmod K \end{bmatrix},$$

and wherein $A_j$ is a pilot allocation matrix of the j-th cell, the [b,k] element of $A_j$ is an index corresponding to pilots allocated to the k-th user of the j-th cell during the b-th training cycle, and b=(0, ..., B−1).

21. The apparatus of claim 20, wherein the executable modules further comprise:

the second determination module configured to determine the first number of pilots to be allocated and the second number of training cycles.

22. The apparatus of claim 21, wherein the second determination module determines the first number of pilots to be allocated and the second number of training cycles at least according to a third number of users in each cell.

23. The apparatus of claim 20, wherein the pilot allocation scheme comprises allocating pilots for each user via a circular shifting.

24. The apparatus of claim 20, wherein the training cycles of the second number of training cycles are continuous training cycles.

25. The apparatus of claim 20, wherein the executable modules further comprise:

a sending module configured to send the pilot allocation scheme of at least the j-th cell.

26. The apparatus of claim 25, wherein the sending module is configured to send the pilot allocation scheme to the base station of each cell after the pilot allocation scheme has been determined.

27. A non-transitory computer readable storage device, comprising at least one executable instruction, which, in response to execution, causes a system comprising a processor to perform operations, comprising:

determining a first number of pilots to be allocated for a multi-antenna system and a second number of training cycles at least according to a third number of users in each cell; and determining a pilot allocation scheme of the each cell according to the first number of pilots to be allocated and the second number of training cycles;

the determining the pilot allocation scheme of the each cell comprising:

determining pilots allocated for users in an l-th cell used during each training cycle, and during each training cycle, allocating pilots of at least a k-th user of an l-th cell to different users in other cells of the multi-antenna system, wherein the multi-antenna system comprises L cells, and each cell comprises a base station with M antennas and K single-antenna users, wherein L, M and K are positive integers, l=(0, ..., L−1), and wherein k=(0, ..., K−1), wherein the first number of pilots to be allocated K' is a prime number not less than $K_{max}$, and $K_{max}$ indicates the third number of users in a cell with most users in the multi-antenna system, wherein the number of training cycles B≤$K_{max}$, wherein the determining the pilot allocation scheme of the each cell comprises allocating pilots for users in the each cell according to the following:

$$A_l = \begin{bmatrix} 0 & 1 & 2 & L & K-2 & K-1 \\ l \bmod K & (l+1) \bmod K & (l+2) \bmod K & L & (l-2) \bmod K & (l-1) \bmod K \\ M & M & M & L & M & M \\ [(B-1)l] \bmod K & [(B-1)l+1] \bmod K & [(B-1)l+2] \bmod K & L & [(B-1)l-2] \bmod K & [(B-1)l-1] \bmod K \end{bmatrix},$$

and wherein $A_l$ is a pilot allocation matrix of the l-th cell, the [b,k] element of $A_l$ is an index corresponding to pilots allocated to the k-th user of the l-th cell during the b-th training cycle, and b=(0, ..., B−1).

28. A device for pilot allocation for a multi-antenna system, wherein the multi-antenna system comprises L cells, each cell comprises a base station with M antennas and K single-antenna users, the device comprises a processor and a memory, the memory stores executable instructions, the processor is connected with the memory via a communication bus, and when the device is operating, the processor executes or facilitates execution of the executable instructions stored by the memory to cause the device to perform operations, comprising:

determining a number of pilots to be allocated and a number of training cycles at least according to a number of users in each cell; and determining a pilot allocation scheme of the each cell according to the number of pilots to be allocated and the number of training cycles, wherein the determining the pilot allocation scheme of the each cell comprises:

determining pilots allocated for users in the l-th cell used during each training cycle, and during each training cycle, allocating pilots of at least the k-th user of the l-th cell to different users in other cells of the multi-antenna system, wherein L, M and K are positive integers, l=(0, . . . , L−1), and k=(0, . . . , K−1), wherein the number of pilots to be allocated K' is a prime number not less than $K_{max}$, and $K_{max}$ indicates the number of users in a cell with most users in the multi-antenna system, and wherein the number of training cycles B≤$K_{max}$, wherein the determining the pilot allocation scheme of the each cell comprises allocating pilots for users in the each cell according to an equation, as follows:

$$A_l = \begin{bmatrix} 0 & 1 & 2 & L & K-2 & K-1 \\ l \bmod K & (l+1) \bmod K & (l+2) \bmod K & L & (l-2) \bmod K & (l-1) \bmod K \\ M & M & M & L & M & M \\ [(B-1)l] \bmod K & [(B-1)l+1] \bmod K & [(B-1)l+2] \bmod K & L & [(B-1)l-2] \bmod K & [(B-1)l-1] \bmod K \end{bmatrix},$$

and wherein $A_l$ is a pilot allocation matrix of the l-th cell, the [b,k] element of $A_l$ is an index corresponding to pilots allocated to the k-th user of the l-th cell during the b-th training cycle, and b=(0, . . . , B−1).

29. A non-transitory computer readable storage device, comprising at least one executable instruction, which, in response to execution, causes a system comprising a processor to perform operations, comprising:

determining a pilot allocation scheme of at least the j-th cell according to another pilot allocation scheme of the l-th cell in a multi-antenna system; and scheduling uplink training of users in at least a j-th cell according to the pilot allocation scheme of at least the j-th cell;

wherein, the determining the pilot allocation scheme of at least the j-th cell comprises:

during each training cycle, allocating pilots, allocated to at least the k-th user in the l-th cell, to different users in at least the j-th cell, wherein the multi-antenna system comprises L cells, each cell comprises a base station with M antennas and K single-antenna users, L, M and K are positive integers, k=(0, . . . , K−1), l=(0, . . . , L−1), j=(0, . . . , L−1), and j≠l, wherein the first number of pilots to be allocated K is a prime number not less than $K_{max}$, and $K_{max}$ indicates a maximum number of users in each cell, wherein the second number of training cycles B≤$K_{max}$, wherein the determining the pilot allocation scheme of at least the j-th cell comprises allocating pilots for users in at least the j-th cell according to an equation:

and wherein $A_j$ is a pilot allocation matrix of the j-th cell, the [b,k] element of $A_j$ is an index corresponding to pilots allocated to the k-th user of the j-th cell during the b-th training cycle, and b=(0, . . . , B−1).

30. A device for pilot allocation for a multi-antenna system, wherein the multi-antenna system comprises L cells, each cell comprises a base station with M antennas and K single-antenna users, the device comprises a processor and a memory, the memory stores executable instructions, the processor is connected with the memory via a communication bus, and when the device is operating, the processor executes or facilitates execution of the executable instructions stored by the memory to cause the device to perform operations, comprising:

determining a pilot allocation scheme of at least a j-th cell according to another pilot allocation scheme of an l-th cell in the multi-antenna system; and scheduling uplink training of users in at least the j-th cell according to the pilot allocation scheme of at least the j-th cell;

wherein the determining the pilot allocation scheme of at least the j-th cell comprises:

during each training cycle, allocating pilots, allocated to at least the k-th user in the l-th cell, to different users in at least the j-th cell, wherein L, M and K are positive integers, k=(0, . . . , K−1), j=(0, . . . , L−1), and j≠l, wherein the first number of pilots to be allocated K is a prime number not less than $K_{max}$, and $K_{max}$ indicates a maximum number of users in each cell, wherein the second number of training cycles B≤$K_{max}$, wherein the determining the pilot allocation scheme of at least the j-th cell comprises allocating pilots for users in at least the j-th cell according to a formula, as follows:

$$A_j = \begin{bmatrix} 0 & 1 & 2 & L & K-2 & K-1 \\ j \bmod K & (j+1) \bmod K & (j+2) \bmod K & L & (j-2) \bmod K & (j-1) \bmod K \\ M & M & M & L & M & M \\ [(B-1)j] \bmod K & [(B-1)j+1] \bmod K & [(B-1)j+2] \bmod K & L & [(B-1)j-2] \bmod K & [(B-1)j-1] \bmod K \end{bmatrix},$$

$$A_j = \begin{bmatrix} 0 & 1 & 2 & \dots & K-2 & K-1 \\ j \bmod K & (j+1) \bmod K & (j+2) \bmod K & \dots & (j-2) \bmod K & (j-1) \bmod K \\ M & M & M & \dots & M & M \\ [(B-1)j] \bmod K & [(B-1)j+1] \bmod K & [(B-1)j+2] \bmod K & \dots & [(B-1)j-2] \bmod K & [(B-1)j-1] \bmod K \end{bmatrix},$$

and
wherein $A_j$ is a pilot allocation matrix of the j-th cell, the [b,k] element of $A_j$ is an index corresponding to pilots allocated to the k-th user of the j-th cell during the b-th training cycle, and b=(0, . . . , B−1).

* * * * *